(12) United States Patent
Wang et al.

(10) Patent No.: US 8,547,580 B2
(45) Date of Patent: Oct. 1, 2013

(54) DIAGNOSTIC TARGETS FOR EVALUATING PRINTING PERFORMANCE

(75) Inventors: Nancy Wang, Sunnyvale, CA (US); Karl Lang, Madison, WI (US)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 12/905,957

(22) Filed: Oct. 15, 2010

(65) Prior Publication Data

US 2012/0092701 A1 Apr. 19, 2012

(51) Int. Cl.
*G06K 5/00* (2006.01)
(52) U.S. Cl.
USPC .......................................... 358/1.15; 358/1.9
(58) Field of Classification Search
USPC .................................. 358/1.15, 1.9
See application file for complete search history.

(56) References Cited

U.S. PATENT DOCUMENTS

| | | | |
|---|---|---|---|
| 5,416,613 A | 5/1995 | Rolleston | |
| 5,488,458 A | 1/1996 | Benedict | |
| 5,760,913 A | 6/1998 | Falk | |
| 6,024,018 A | 2/2000 | Darel | |
| 6,048,117 A | 4/2000 | Banton | |
| 6,141,120 A | 10/2000 | Falk | |
| 6,324,353 B1 | 11/2001 | Laussermair | |
| 6,684,035 B2 | 1/2004 | Furno | |
| 7,032,508 B2 | 4/2006 | Seymour | |
| 7,760,397 B2 | 7/2010 | Hosier | |
| 2004/0165199 A1 | 8/2004 | Klassen | |
| 2006/0170996 A1 | 8/2006 | Headley | |
| 2007/0146742 A1 | 6/2007 | Klassen | |
| 2009/0027729 A1* | 1/2009 | Trelewicz et al. | 358/3.06 |
| 2010/0060691 A1 | 3/2010 | Tanase | |

* cited by examiner

*Primary Examiner* — Qian Yang
(74) *Attorney, Agent, or Firm* — Wong, Cabello, Lutsch, Rutherford & Brucculeri, LLP

(57) ABSTRACT

Print performance is evaluated by printing a diagnostic image comprising color patches. Colorant usage in the printed image is measured by, for instance, scanning each patch. Measured color values are then compared to target color values. Based on the comparison, groups of patches whose color values vary significantly from expectations are identified. Variant groups are then analyzed to identify, in addition to color quality control problems, spatial problems that affect only a localized area of a printed page. Such spatial problems may include, for example, problems with contrast or streaks. A heat map illustrating the differences may be generated to help an operator visualize the spatial problem. A template for the diagnostic image may be selected from a plurality of randomly generated diagnostic targets based on total colorant usage for at least one colorant in each column of color patches. Certain patches may be predefined across for each candidate target.

18 Claims, 8 Drawing Sheets

FIG. 3

*300* Target

*310* Patches

| 15,0,0 | 0,15,0 | 0,0,15 | 15,0,0 | 0,15,0 | 0,0,15 | 15,0,0 | 0,15,0 | 0,0,15 |
|---|---|---|---|---|---|---|---|---|
| 10,0,13 | 3,2,2 | 7,4,9 | 14,2,8 | 13,2,10 | 10,15,9 | 8,1,12 | 8,11,13 | 14,7,10 |
| 0,11,10 | 12,10,8 | 9,0,2 | 4,6,10 | 10,5,13 | 13,2,2 | 13,4,10 | 15,4,7 | 4,2,9 |
| 1,2,1 | 11,3,6 | 13,11,1 | 12,6,0 | 8,12,15 | 13,13,14 | 1,14,4 | 3,7,5 | 13,5,6 |
| 12,12,0 | 7,8,7 | 1,3,5 | 13,12,10 | 9,6,9 | 8,14,11 | 14,9,7 | 9,12,12 | 0,6,6 |
| 13,15,5 | 0,0,0 | 4,7,1 | 10,10,2 | 2,10,14 | 4,6,14 | 10,7,4 | 0,0,0 | 9,10,4 |
| 12,14,10 | 1,4,3 | 15,15,15 | 7,10,3 | 1,11,4 | 1,5,3 | 15,15,15 | 12,0,15 | 14,1,8 |
| 7,8,15 | 14,15,14 | 14,12,8 | 2,8,12 | 7,9,8 | 11,7,0 | 6,11,1 | 14,15,9 | 11,15,3 |
| 6,1,13 | 10,15,1 | 3,7,10 | 9,8,0 | 6,15,13 | 9,0,6 | 5,10,4 | 9,15,8 | 5,2,7 |
| 5,2,5 | 15,9,6 | 15,15,15 | 4,14,6 | 0,7,3 | 10,14,5 | 15,15,15 | 0,1,10 | 6,9,8 |
| 3,9,11 | 0,0,0 | 5,7,14 | 5,0,15 | 15,9,10 | 14,2,14 | 5,12,9 | 0,0,0 | 3,4,8 |
| 11,7,5 | 8,4,13 | 4,14,5 | 3,5,11 | 4,15,2 | 3,8,12 | 1,3,7 | 15,10,8 | 11,13,12 |
| 9,9,11 | 5,9,14 | 13,9,10 | 9,7,14 | 3,9,14 | 8,13,6 | 8,2,15 | 14,7,12 | 11,6,13 |
| 15,7,1 | 6,13,15 | 4,7,15 | 11,11,15 | 11,3,9 | 10,5,12 | 5,3,5 | 10,2,3 | 15,14,8 |
| 1,15,13 | 10,9,9 | 12,11,7 | 10,12,11 | 15,9,4 | 14,5,12 | 11,3,14 | 10,8,15 | 3,8,3 |
| 15,5,7 | 14,12,15 | 1,9,4 | 8,3,7 | 14,6,15 | 2,15,12 | 14,15,8 | 10,10,9 | 2,10,12 |

FIG. 4

*400* Measured Color Data

| | | | | | | | | |
|---|---|---|---|---|---|---|---|---|
| 15,5,0 | 0,14,2 | 4,4,13 | 15,0,0 | 1,15,0 | 0,0,15 | 14,1,0 | 1,14,0 | 0,0,15 |
| 10,1,12 | 1,0,0 | 6,3,8 | 13,2,9 | 14,3,11 | 10,15,8 | 7,2,13 | 9,12,14 | 15,7,10 |
| 1,13,14 | 10,10,10 | 8,13,0 | 5,6,9 | 9,4,13 | 14,2,2 | 13,5,10 | 14,6,8 | 4,2,11 |
| 1,4,2 | 10,4,8 | 12,12,6 | 13,8,0 | 8,11,15 | 12,13,15 | 2,15,4 | 4,7,5 | 14,6,8 |
| 10,12,5 | 5,9,7 | 1,3,4 | 14,13,10 | 10,7,8 | 8,13,10 | 14,10,6 | 9,13,11 | 0,6,5 |
| 13,15,5 | 0,0,0 | 5,6,0 | 10,10,3 | 3,11,14 | 5,7,13 | 11,6,4 | 1,1,0 | 9,11,5 |
| 12,15,10 | 1,5,2 | 14,15,14 | 6,9,4 | 2,10,3 | 1,4,4 | 15,15,14 | 12,0,15 | 13,2,9 |
| 6,9,15 | 12,15,14 | 15,11,9 | 1,7,11 | 8,9,10 | 12,8,0 | 7,11,0 | 15,15,9 | 12,14,4 |
| 5,2,14 | 10,15,1 | 2,7,11 | 10,8,0 | 7,14,14 | 9,0,5 | 4,11,4 | 8,14,7 | 5,3,8 |
| 4,2,6 | 15,8,7 | 15,15,15 | 2,14,6 | 0,6,3 | 10,15,6 | 14,15,15 | 0,2,9 | 6,8,9 |
| 2,8,12 | 0,1,1 | 4,8,15 | 5,0,15 | 14,9,9 | 15,3,15 | 4,11,10 | 0,0,0 | 2,5,9 |
| 10,8,5 | 8,3,12 | 5,14,5 | 4,6,11 | 5,14,3 | 3,7,12 | 1,2,6 | 15,10,8 | 11,13,11 |
| 8,10,12 | 5,8,14 | 14,9,11 | 9,7,15 | 4,10,14 | 7,12,6 | 7,3,15 | 13,7,12 | 12,6,12 |
| 15,6,1 | 5,13,15 | 4,8,14 | 11,11,14 | 10,2,9 | 11,5,11 | 5,3,4 | 10,3,4 | 15,15,9 |
| 2,15,12 | 10,10,8 | 11,11,8 | 10,12,11 | 15,9,5 | 13,6,11 | 11,4,14 | 9,9,15 | 2,9,2 |
| 15,4,7 | 15,11,15 | 0,10,4 | 9,3,6 | 15,5,15 | 3,14,14 | 15,15,9 | 11,11,8 | 2,10,12 |

*410* Patches

DIAGNOSTIC TARGETS FOR EVALUATING PRINTING PERFORMANCE

TECHNICAL FIELD

Embodiments relate generally to evaluating printing press performance, and, more specifically, to techniques for detecting print performance issues using diagnostic targets.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Operators of printing presses and other print devices or systems (hereinafter collectively referred to as "print systems") may rely upon various print tests to calibrate or diagnose problems with their print systems. For example, operators may perform such tests on a periodic basis, or before major print jobs, so as to ensure that print jobs do not suffer from problems such as ink imbalances or mechanical defects. One such class of tests involves printing one or more "diagnostic targets" having color or grayscale patches. The operator may utilize the target to visually recognize color problems based on personal experience and/or comparisons to other targets printed under optimal circumstances. The operator may then take appropriate corrective action.

In some embodiments, the analysis of a printed diagnostic target may be automated. Colorant usage on the printed target may be measured via, for example, a digital scanning system, to arrive at measured color values. The measured values may then be compared to baseline values indicating expected measurements for the target when printed under optimal circumstances. Based on these comparisons, "deltaE" values may be computed for each printed color. An analysis of the deltaE values can identify color imbalances as well as appropriate corrective measures.

An example of such an analysis of a diagnostic target is described in U.S. Pat. No. 7,760,397, issued Jun. 2, 1998 and entitled "Calibration sheet and method of calibrating a digital printer," the contents of which are hereby incorporated by reference for all purposes as if set forth in their entirety. Quality control images are printed and then scanned for analysis. When differences between measurements and expectations are identified, the differences are evaluated to create quality control metrics. Before any digital image is printed, a print system may filter the digital image using the quality control metrics to compensate for the color discrepancies.

Print systems print diagnostic targets based on a digital data representative of the diagnostic target, such as a PostScript or PDF document. This digital data is hereinafter referred to as a template for a diagnostic target, or the target template. The template specifies color values that a print system should print in any of a variety of color metric systems hereinafter referred to a color spaces. The print system utilizes the specified color values to determine how much colorant to apply to any given point when printing the diagnostic target. As used herein, colorant refers to any discrete color of ink that a print system is capable of applying to a page. A color of ink is discrete when the printer can print the color without mixing ink sources. For example, many printers are capable of applying four colorants—cyan, magenta, yellow, and black.

One technique for generating useful target templates involves generating a large number of candidate target templates and then selecting one or more of the candidate target templates that meet certain criteria. For each candidate target template, a grid of colored patches is generated. The grid is created by first selecting a set of colored patches that are to be tested. The selection of patch color values for color quality control purposes may occur in a variety of manners, including using well known sets of colors and/or optimizing colors for specific print systems or print jobs. The grid is then populated by randomly or pseudo-randomly selecting the position within the grid for each patch in the set of color patches.

While the above techniques greatly simplify the process of identifying color defects, other defects that may result in print performance issues are more difficult to identify through conventional techniques. One such class of defects, collectively referred to herein as spatial defects, causes print performance issues that are localized to particular regions of a printed page. For example, a defective print system may print a region in the bottom left corner of a page more lightly than the rest of the page. Or, the defective print system may print vertical streaks of color across the page. Many spatial issues do not manifest themselves obviously on each and every printed page, but rather appear under only certain circumstances—such as in pages having certain balances of colors or in pages with photographs heavy in contrast. To be certain that such issues do not exist, one would typically need to print large quantities of different test jobs, at a potentially prohibitive expense in terms of time or money. Thus, operators may elect not to test for spatial issues, and thus spatial defects may not be detected until a defective print job has already been performed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 depicts an example diagnostic target that may be printed by a print system;

FIG. 4 depicts example measured color data;

DETAILED DESCRIPTION

Figure 1:
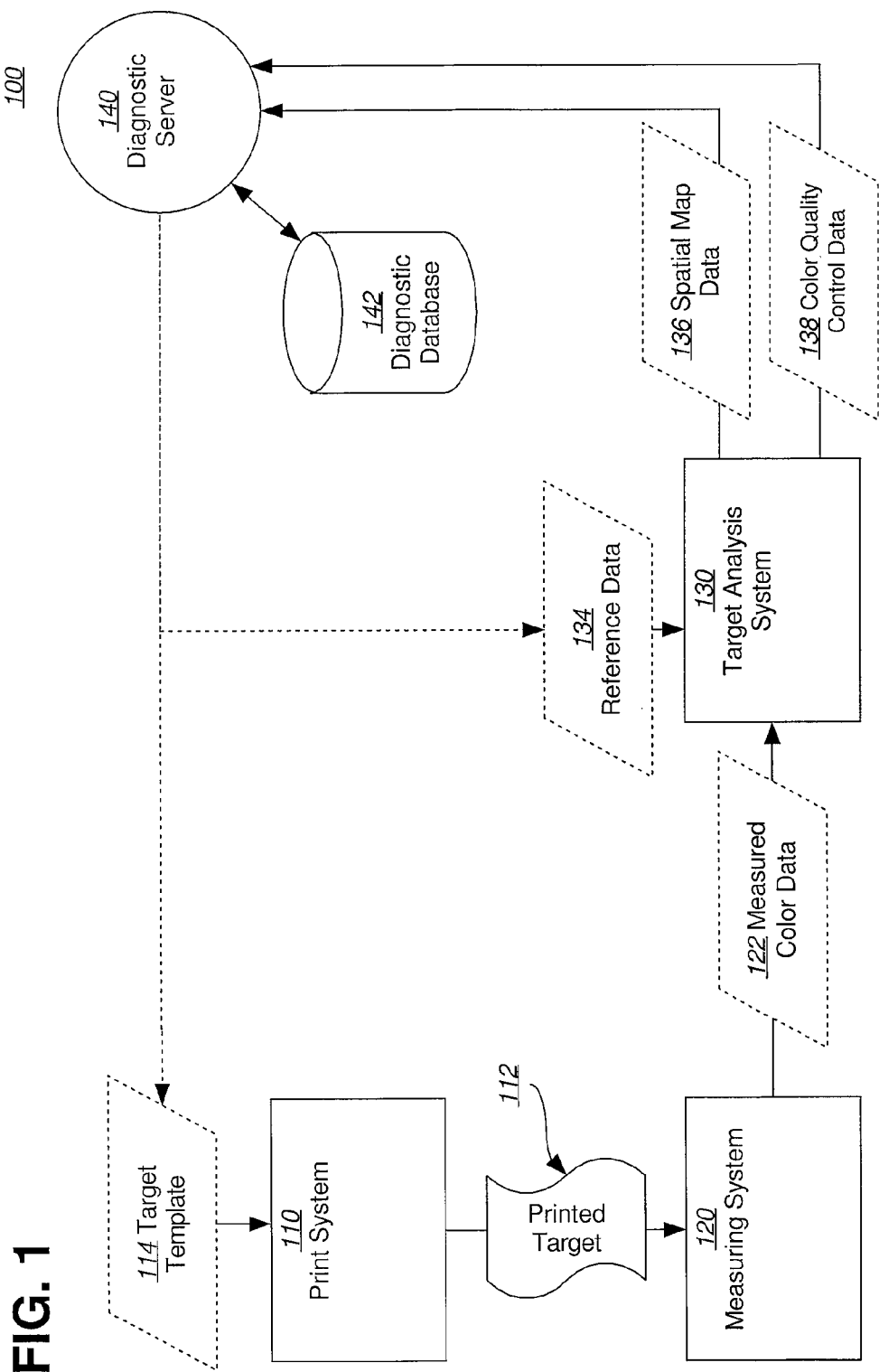
FIG. 1 is a block diagram that illustrates an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural/Functional Overview 2.1. Print System
2.2. Measuring system
2.3. Target Analysis System
2.4. Diagnostic Server
2.5. Variations and Alternatives
3.0. Functional Overview
  3.1. Variations and Alternatives
4.0. Example Diagnostic Target
5.0. Example Spatial Maps
6.0. Identifying Spatial Issues via Groups
7.0. Diagnosing Issues and Identifying Corrective Measures
8.0. Generating and Selecting a Diagnostic Target Template
  8.1. Site, Profile, or System Specific Customizations
  8.2. Number of Patches
  8.3. Color Selection and Distribution
  8.4. Predefined patches
  8.5. Example method
9.0. Implementation Mechanism—Hardware Overview
10.0. Extensions and Alternatives 1.0. General Overview Approaches, techniques, and mechanisms are disclosed for evaluating print performance. In an embodiment, spatial issues may be identified by spatially mapping differences between printed colors and expected colors at each patch of a diagnostic target. In an embodiment, these spatial issues and/or other print issues may be diagnosed during or based on a color quality control process. More specifically, diagnostic target(s) used for color quality control may also be used to identify other print performance issues, such as spatial issues that are specific to a particular region of a printed page. In an embodiment, color issues and spatial issues may both be diagnosed with a single diagnostic target, thus reducing the amount of effort required to test a print system for these issues. However, in an embodiment, the diagnostic target(s) used to diagnose spatial issues need not necessarily be used for a color quality control process.

According to an embodiment, a print system is evaluated by first printing a copy of a diagnostic target. Colorant amounts in the printed copy are measured to arrive at measured color values for the diagnostic target. Colorant usage may be measured in a variety of manners, including by an imaging device, such as a scanner. For each of a number of measured points within the printed copy of the diagnostic target (e.g. for each color patch), the measured color value for that point is compared to an expected color value for that point. The expected color value indicates a color value that the imaging device would have been expected to measure at the measured point under ideal printing conditions. Based on the comparison, a difference value for the point is calculated. The difference value for each measured point is then stored in association with spatial data (e.g. coordinates) for the measured point, resulting in spatial map data. Among other effects, the retention of this spatial data facilitates analyses of performance issues that would not normally be recognized during conventional color quality control processes.

In an embodiment, based on the spatial map data, groups of points that individually or collectively exhibit statistically significant difference values relative to normal differences are identified. The clusters may then be analyzed to determine if they are indicative of potential performance problems, such as the afore-mentioned spatial issues. For example, a cluster of highly variant patches streaking down the center of the diagnostic target may be indicative of a potential problem with streaks in future print jobs. As another example, a cluster of highly variant patches in the top right corner of the printed target may be indicative of a potential problem with uneven application of colorant in certain types of printed pages.

In an embodiment, based on the spatial map data, one or more patterns may be discovered. The patterns may be associated with possible corrective measures. An operator of the tested print system may thus take the indicated corrective measures to improve the performance of the print system.

In an embodiment, groups or patterns are identified automatically, by an analysis or diagnostic component. The identification process may make use of machine learning and/or pattern recognition techniques applied to a knowledge base of spatial map data, diagnosed spatial issues, and/or attempted corrective measures. In an embodiment, groups may instead be identified by a user. To assist the user in the identification of clusters, the spatial map data is depicted visually to the user, via, for example, a two-dimensional map in which each calculated difference is represented by an indicator at its corresponding location. In an embodiment, the spatial map data is depicted to the user as a heat map arranged in like manner as the target, with the color of each patch reflecting the difference value(s) corresponding to that patch. However, a variety of other presentation techniques may also be utilized to communicate the spatial map data to the user.

While the foregoing techniques may utilize diagnostic targets having any arbitrary arrangement of color patches, in some embodiments certain arrangements of color patches may be more effective at diagnosing color and spatial problems. For example, a diagnostic target in which the color patches are arranged as columns, such that each column includes a set of patches, may be better suited to certain embodiments. In an embodiment, the color patches are arranged in a grid. As another example, the optimal colors to select for each patch in the arrangement may vary from print system to print system.

In an embodiment, the arrangement of a diagnostic target may be identified and fine-tuned for effectiveness by experimentation over time. In an embodiment, the experimentation required to identify a more effective arrangement for a target may be greatly reduced or eliminated by randomly or pseudo-randomly distributing colors over the arrangement of color patches. In an embodiment, randomly or pseudo-randomly distributed color values for the patches in each column in an arrangement are, on average, such that an approximately equal amount of at least one colorant would be used by a target print system to print each column. In an embodiment, such an arrangement may be achieved procedurally, without necessarily involving randomization.

In other aspects, the invention encompasses a computer apparatus and a computer-readable medium configured to carry out the foregoing steps.

2.0. Structural/Functional Overview

FIG. 1 is a block diagram that illustrates an example system 100 in which the techniques described herein may be practiced, according to an embodiment. System 100 includes print system 110, printed diagnostic target 112, target template data 114, measuring system 120, measured color data 132, analysis system 130, reference data 134, spatial map data 136, color quality control data 138, diagnostic server 140, and diagnostic database 142.

2.1. Print System

Print system 110 is a set of one or more devices that work together to execute print jobs. Print system 110 may take a variety of forms, such as a standalone printing device or a set of one or more printing devices connected to one or more separate computing devices executing one or more print server(s). Print system 110 may print color, grayscale, and/or black-and-white media.

Printed diagnostic target 112 is a sheet of paper, or a unit of any other suitable print media, on which print system 100 has printed a set of color patches. Each color patch is of a single color, and most or all of the color patches are of a unique and different color relative to all other color patches on that page. The color patches may be printed in a variety of arrangements. In an embodiment, at least some of the color patches are printed in multiple columns. For example, the color patches may be arranged as a grid of colors.

Target template data 114 is digital data that describes diagnostic target 112 in sufficient detail to enable print system 110 to print diagnostic target 112 based on the target template data 114. Target template data 114 may be, for instance, data in a printable format, such as a PostScript document, PDF document, vector graphics file, or bitmap file. Target template data 114 describes locations at which print system 110 is to print each of the color patches on diagnostic target 112, as well as color values to print at those locations. The color values may be specified in any format in any printable color space. Print system 110 is capable of interpreting target template data 114 in such a manner as to determine how much of each of a set of ink colors to apply to each of a number of defined points (or dots) on the diagnostic target 112.

Target template data 114 may be stored persistently in a fixed or user-upgradeable memory at a printing device in print system 100, or in a storage device accessible to a print server in print system 100. Alternatively, the target template data 114 may be communicated to print system 110 via a print command from a client device. The target template data 114 may have been pre-installed by a manufacturer of print system 110, or the target template data 114 may have been downloaded and stored by an operator of print system 110. In an embodiment, the target template data 114 originates from a manufacturer of print system 110 or an operator of a diagnostic server 140. The target template data 114 may have been tailored to (and therefore is unique to) print system 100, or target template data 114 may have been created for a specific type or class of print systems.

2.2. Measuring System

Measuring system 120 includes one or more devices that collectively generate measured color data 122 based on printed diagnostic target 112. Measured color data 122 includes at least one color value for some or all of the patches printed in diagnostic target 112. Measured color data 122 may reflect direct measurements of colorant usage at each of a number of points in printed diagnostic target 112, or may instead reflect indirect measurements of colorant usage by means of, for example, sensing light reflected at each of a number of points in printed diagnostic target 112.

Measuring system 120 may include a standalone imaging device, such as a scanner or camera. In an embodiment, the measuring system includes a spectrophotometer or colorimeter; however, the imaging device may be any device capable of measuring color values in printed diagnostic target 112 at a frequency of at least once per color patch. Measuring system 120 further includes logic integrated into the imaging device and/or executed by a separate computing device that, for instance, performs various computational functions such as translating sensor data from the imaging device into measured color data 122 and measured color data 122 as a digital file.

Measured color data 122 may be derived, for instance, from an analysis of scanned target data such as a bitmap or other digital image file in which each sampled dot is represented as a pixel. In an embodiment, however, no image file is created. Rather, measuring system 120 may produce a single measured color value for each patch by sampling the patch multiple times and averaging some or all of the sampled values.

2.3. Target Analysis System

Target analysis system 130 includes one or more computing devices that analyze measured color data 122 in view of reference data 134. Reference data 134 provides a point of comparison for an analysis of measured color data 122, in that it includes data indicating expected color values for each color patch in printed diagnostic target 112. That is, reference data 134 indicates the color values measuring system 120 would be expected to measure when print system 110 is functioning under ideal conditions. Reference data 134 may be part of template 114. Reference data 134 may instead be separate from but optionally based on template 114. Reference data 134 may be stored in any suitable file system or database accessible to target analysis system 130.

Reference data 134 may have been provided and/or generated by any of an operator or manufacturer of print system 112, or a provider of diagnostic server 140. Reference data 134 may have been calculated based on measurements of a printed diagnostic target taken during a quality control of print system 110 under ideal operating conditions. Reference data 134 may alternatively have been calculated based on measurements of a printed diagnostic target taken from an optimal print system of the same type or class as print system 110. Alternatively, reference data 134 may be extracted directly from color values specified for each color patch in template 114, with conversions between color spaces as needed (e.g., if the template 114 describes colors in a print color space such as cyan-magenta-yellow-black (CMYK), while the measuring system 120 measures color values in a color space such as red-green-blue (RGB)).

The color values in measured color data 122 and reference data 134 may take any forms, and may be converted as necessary to other formats for comparisons. For example, each measured color value may be a set of three numbers representative of various parameters in an CIELab color space. Other color spaces may also or instead be utilized.

The analysis of measured color data 122 may result in color quality control data 138, which indicates differences in individual colors. Color quality control data 138 may be, for example, a table of deltaE values for each color printed in diagnostic target 112. Color quality control data 138 may further or instead include differences for other colors not printed in the diagnostic target 112, but calculated based upon differences in colors actually printed in diagnostic target 112.

The analysis of measured color data 122 may further result in spatial map data 136, which indicates the location(s) of groups of patches or points within the printed diagnostic target 112 for which the measured color values differ significantly from the expected color values for the corresponding patches. For example, the group may form a spatial cluster, pattern, or directional trend. The group may be identified via a variety of statistical techniques, such as discussed in other sections. Spatial map data 136 may be separate from, part of, and/or implicit from the ordering of color quality control data 138.

Spatial map data 136 may, for example, specify a two-dimensional spatial map, in which the difference of each patch or point described in measured color data 122 is represented by a visual indicator at a location corresponding to the location at which the patch or point was measured in diagnostic target 112. For example, spatial map data 136 may describe or be used to compute a "heat map" in which locations are colored on a sliding scale from, for instance, red to green, based upon how much color values measured at those locations vary from expected color values for patches at those corresponding locations (e.g., the reddest color indicating the maximum difference from the expectation and the greenest color indicating minimal or no difference from the expectation). As another example, spatial map data 136 may be simply a table of location data and corresponding measures of differences.

Color quality control data 138 and spatial map data 136 may be stored in any location accessible to target analysis system 130. One or both of color quality control data 138 and spatial map data 136 may be utilized to generate a report to the operator, which report may assist the operator in diagnosing print performance issues. One or both of color quality control data 138 and spatial map data 136 may be submitted to a diagnostic server or other component for analysis.

In an embodiment, target analysis system 130 produces only one of color quality control data 138 or spatial diagnostic data 136. In an embodiment, target analysis system 130 produces additional diagnostic data based on its analysis of measured color data 122, which data may be utilized for purposes other than color quality control or diagnosing spatial problems.

2.4. Diagnostic Server

Diagnostic server 140 is a set of one or more applications that collectively function to analyze data generated by target analysis system 130 and, based upon that analysis, identify print performance issues in print system 110. Diagnostic server 140 executes on one or more computing devices that are coupled to target analysis system 130. In an embodiment, diagnostic server 140 is used exclusively by an operator of print system 110. In an embodiment, diagnostic server 140 provides services to many different print systems operated by many different operators, and as such is accessible over a wide area network such as the Internet.

Diagnostic server 140 maintains a database 142 of print performance data to which diagnostic server 140 may refer in identifying print performance issues. The database 142 may store, for example, spatial map data 136 collected over time from a number of different print systems, along with confirmed performance issues corresponding to various instances of spatial map data 136. Optionally, database 142 may be continuously updated as print systems send spatial map data 136 to diagnostic server 140.

2.5. Variations and Alternatives

System 100 is but one example system in which the techniques described herein may be practiced. Other systems may include additional or fewer components, in potentially varying arrangements. For example, in an embodiment, diagnostic server 140 and database 142 are optional. Instead, the operator directly analyzes spatial map data 136 and color quality control data 138, or reports based thereon.

While print system 110, measuring system 120, target analysis system 130, and diagnostic server 140 are depicted as distinct and separate elements of system 100, in an embodiment, some or all these elements may be combined together. In an embodiment, components of measuring system 120 may be integrated into print system 110. For example, a printing device in print system 110 may also function as an imaging device in that the printing device may include a scanning mechanism to which printed diagnostic target 112 may automatically or manually be fed. In an embodiment, various logic components of print system 110, measuring system 120, and target analysis system 130 are executed from a set of one or more applications executing on a single computing device. In an embodiment, target analysis system 130 and diagnostic server 140 are collocated on a single computing device, either on-site or off-site. In an embodiment, system 100 is implemented by a single printing device, including a print component, a scanning component, and processing components for executing instructions that, when executed, cause performance of the techniques described herein.

3.0. Functional Overview

Figure 2:
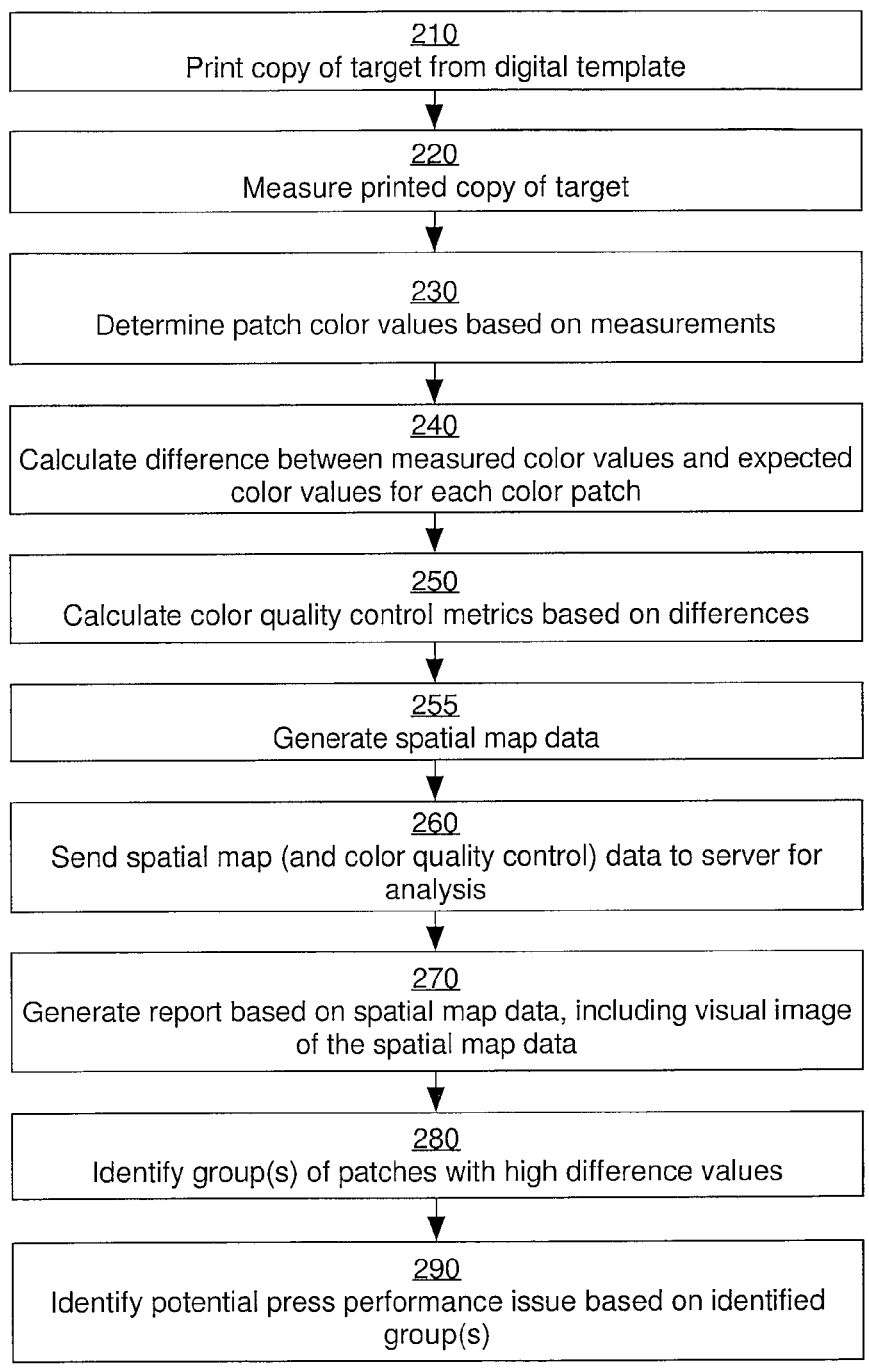
FIG. 2 is a flow chart illustrating an example method for identifying print performance issues.

FIG. 2 is a flow chart 200 illustrating an example method for identifying print performance issues, according to an embodiment.

At block 210 of FIG. 2, a print system, such as print system 110, accesses target template data, such as target template data 114, and prints a copy of a diagnostic target, such as printed diagnostic target 112, based thereon. The print system may perform this step at scheduled intervals and/or in response to any of a variety of events, such as receiving a command from an operator of the print system, detecting that a certain number of pages or print jobs have been printed since the print system was last tested, and/or detecting that certain conditions exist (e.g., print errors). In an embodiment, the print system performs this step automatically whenever print jobs meeting certain conditions are requested.

At block 220, a measuring system, such as measuring system 120, measures the printed copy of the diagnostic target to produce measured target data. The measuring system measures color values at each of a number of points in the printed copy of the diagnostic target. Color values may be sampled at a wide variety of resolutions and color depths. For example, an imaging device may sample color values at a standard printing resolution, such as three-hundred dots per inch, with the color value at any particular dot represented by at least a 24-bit or 32-bit color value. As another example, color values may be sampled at a very low resolution—for instance, the measuring system may be optimized to sample a single point from each color patch.

At block 230, the measuring system or a target analysis system, such as target analysis system 130, uses the measured target data to determine color values for some or all of the color patches in the printed copy of the diagnostic target. The determined color values for the patches are hereinafter referred to as measured color values, even though they may actually be an average and/or conversion of measured color data.

To arrive at the measured color values, the system may need to determine which portions of the measured target data correspond to which color patches in diagnostic target. For example, the target analysis system may utilize pattern recognition logic and/or location information indicated by reference data to locate one or more measured color values that correspond to each color patch. If the measured target data includes multiple measured color values corresponding to different sampled points within a patch, then the measured color values may be analyzed statistically (e.g., averaged) to reduce the number of measured color values for the patch to a single measured value. Alternatively, or in addition, one or more color values for predefined points within the color patch may be taken as representative of the color patch, while the other measured color values for the patch may be discarded.

At block 240, the target analysis system compares the measured color value identified for each patch to a corresponding expected color value for the patch to calculate a measure of difference between the measured color value and the expected color value. Expected color values may be defined in, for instance, reference data such as reference data 134. This step may involve, for instance, conversion of one or both of the measured color values and the expected color values to a different format, such as a format corresponding to a different color space or a format having a different color depth.

At block 250, the measures of difference are used to calculate color quality control metrics, such as quality control data 138, using any suitable technique.

At block 255, the measures of difference are used to generate spatial map data, such as spatial map data 136. In an embodiment, steps 250 and 255 are performed in a same step. In an embodiment, one of steps 250 or 255 may be optional.

At block 260, the color quality control data and/or spatial map data are optionally reported to a diagnostic server, such as diagnostic server 140.

At block 265, the diagnostic server optionally saves the color quality control data and/or spatial map data to a database, such as database 142, in which the data may be stored in association with data collected from analyses of other copies of the diagnostic target printed by the print system and/or other print systems of the same or similar type.

At block 270, the target analysis system or the diagnostic server optionally generates a report based on the color quality control data and/or spatial map data. The report may be printed or otherwise displayed to an operator. The report may include, for instance, a graphical depiction of the spatial map data, such as a heat map.

At block 280, based on the spatial map data, one or more groups of patches whose measured color values deviate significantly from expected values are identified. The patches in a group may be identified as deviating significantly from expected values using any of a variety of statistical analyses. In an embodiment, these analyses involve comparing the difference between a measured value and an expected value, hereinafter "difference value," to a normal difference value. The normal difference value may be, for example, a predefined or user-configurable threshold, a standard deviation, an average of all difference values for the printed target, an average of difference values in the same region(s) of the printed target as the group of patches, a historical average of difference values, and so on. In an embodiment, a group of patches is a cluster of adjacent patches that have measures of differences that are, in aggregate, higher than surrounding patches not in the cluster. In an embodiment, a group of patches exhibit a specific spatial pattern or directional trend.

In an embodiment, the groups may be identified by an operator of the print system. The report generated at block 270 may help facilitate the operator's recognition of the clusters. For example, the spatial heat map may draw the operator's attention to certain regions of diagnostic target having high differences. In an embodiment, the target analysis system or the diagnostic server may instead or additionally automatically identify the one or more clusters using various pattern recognition techniques.

At block 290, one or more print performance problems and/or corrective measures may be identified based on the identified groups. In an embodiment, the problems and/or corrective measures involve spatial print issues. The problems or corrective measures may be identified manually by an operator, or may be identified by at least partially automated processes at the target analysis system or diagnostic server. For example, the diagnostic server may employ various machine learning or pattern recognition techniques to compare the color quality control data and/or spatial map data to data already collected in database. Based on the comparison, the diagnostic server may identify to the print system operator one or more potential performance problems from which the print system may be suffering. The diagnostic server may also or instead suggest one or more corrective measures.

3.1. Variations and Alternatives

FIG. 2 illustrates but one of many possible methods of practicing the techniques described herein. Other methods may include additional or fewer steps, in similar or varying arrangements.

The illustrated method may be performed with the assistance of a human operator that, for instance, feeds the printed target to the measuring system and/or provides input that commands the performance of various steps. Alternatively, the entire method may be executed automatically, without human intervention.

In an embodiment, the report of step 270 may be generated subsequent to the diagnostic server performing step 290, and may or may not include further enhancements, such as a diagnosis of a problem by the diagnostic server, possible corrective measures, and/or highlights to draw the operator's attention to specific clusters of patches that have statistical significance.

In an embodiment, step 280 is performed implicitly as a part of step 290, in that the spatial map data may be matched to one or more known patterns having known diagnoses without any clusters having been explicitly defined and enumerated.

In an embodiment, multiple measured color values may serve as a point of comparison for any given patch. For example, a patch may be subdivided into subpatches, and each subpatch may be analyzed for deviation from the expected color value for the patch. Such an embodiment may produce, for instance, a spatial map of differences that is of greater granularity than the patches in the original diagnostic target.

In an embodiment, the foregoing steps may be repeated with respect to additional printed copies of the same or different targets. For example, differences identified in additional printed copies may be averaged together to form a composite spatial map, thereby reducing the potential for misdiagnosis based on temporary and anomalous print conditions, or based on inadequacies inherent to any given diagnostic target. As another example, different targets may be optimized to test for different issues, and thus the print system may print copies of each of the different targets to test for these different issues.

4.0. Example Diagnostic Target

FIG. 3 depicts an example diagnostic target 300 that may be printed by a print system, according to an embodiment. The diagnostic target 300 includes a grid of color patches 310, alignment dots 320, and horizontal bar 330. Each patch 310 is of a single, uniform, color, though different patches are of different colors. Due to publication constraints, no colors are depicted in FIG. 3. However, for illustrative purposes, the colors have been replaced by symbolic values. For example, the value (0,0,15) may symbolize a yellow color patch, while the value (15,0,0) may symbolize a cyan color patch. The values are illustrative only, and do not imply limitations on the color spaces and the types of colors that may be used in a diagnostic target. Indeed, patches 310 may be of any arbitrary color, in any printable color space.

Diagnostic target 300 is but one example of a diagnostic target. Other diagnostic targets may include more or fewer color patches, and may have similar or different arrangements both in terms of color placement and patch layout. In an embodiment, the patches are actually in grayscale rather than color. Although the color patches in FIG. 3 are approximately square in shape, in other embodiments color patches may be rectangular or any other suitable shape.

5.0. Example Spatial Maps

FIG. 4 depicts example measured color data 400, according to an embodiment. Measured color data 400 may have been generated by, for instance, sampling one or more color values from each color patch 310 of a printed copy a target 300, then averaging the sampled values together to produce an average color value for each patch 310. As evidenced by discrepancies between the measured color values in color patches 410 and the expected color values in color patches 310, the print system responsible for printing the copy of the target has not reproduced an exact copy of the target 300. For purposes of illustration, measured color data is illustrated as a grid of patches. However, measured color value may take a variety of forms, including a table or a list of measured color values. Also for illustrative purposes, the measured color values are described within the same arbitrary color space as the color values of FIG. 3. However, measured color values may be in any color space relative to the color values defined in the target's template.

Figure 5:
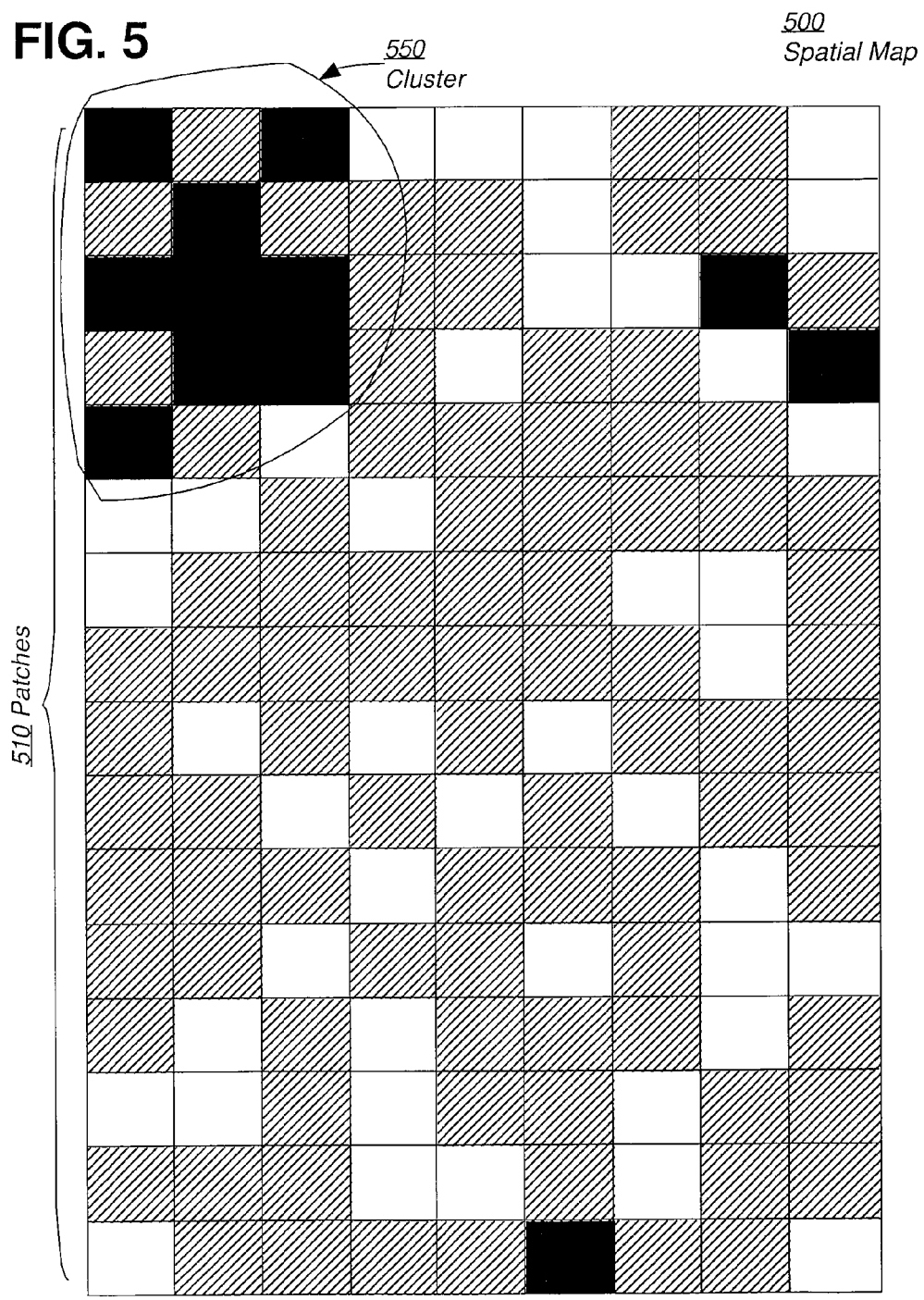
FIG. 5 depicts an example spatial map that may be displayed to a user.

FIG. 5 depicts an example spatial map 500 that may be displayed to a user, according to an embodiment. Like diagnostic target 300, spatial map 500 is organized as a grid of patches 510. Each patch 510 in spatial map 500 corresponds to a similarly located color patch 310 in target 300 and a similarly located measured color patch 410 in measured color data 400. Each patch 510 is shaded in accordance with the degree to which the measured color value for the similarly situated patch 410 deviates from the expected color value of the similarly situated color patch 310. For example, the top left patch 310 has an expected color value of (15,0,0), and the top left patch 410 has a measured color value of (15,5,0). A target analysis system has determined that the difference between the two color values is high, and the top left patch 510 of spatial map 500 is therefore shaded black. Meanwhile, the bottom right corner patch 510 of spatial map 500 is shaded white, thereby indicating that there is no difference between the expected color value of the bottom right corner patch 310 and the measured color value of bottom right corner patch 410.

Spatial map 500 may be used to predict spatial print issues for the print system that printed the copy of target 300 upon which the measured color data 400 is based. For example, based on the shading of patches 510, it is readily apparent that there is a group 550 of highly variant patches in the top left corner of spatial map 500. Group 550 may be indicative of, for example, a mechanical problem in the print system that may cause the print system to print ink unevenly in the top left corner of some or all printed documents. That this problem is a localized spatial problem as opposed to a global color quality control problem may be inferred from the concentration of the high differences in a cluster—owing to the random distribution of color values across target 300, it is not likely that a global color quality control issue would cause an entire cluster of patches to have a high difference, without also causing most of the other patches 510 to have high differences.

On account of publication constraints, FIG. 5 depicts only three levels of shading corresponding to three difference thresholds. However, any number of shading levels may be used to represent spatial map data. For example, a sliding scale of colors from green to red may be used to represent various degrees of difference. Moreover, thresholds for categorizing differences as "high" or "low" may vary from embodiment to embodiment and from print system to print system. Other types of indicators may also or instead be used to visually represent a measure of difference, including symbols and numbers.

6.0. Identifying Spatial Issues via Groups

As discussed above, spatial issues may be identified by detecting groups of measured points or patches whose measured color values deviate significantly from their expected values. These groups may be detected visually, or by a variety of computer analyses. The groups may also be explicitly identified and enumerated, or may be identified implicitly as part of a pattern recognition or comparison algorithm. To avoid misdiagnosing a color issue as a spatial issue, groups include at least two, but typically more patches. A minimum group size may be designated. The minimum group size may further be modified as needed based on various printing considerations.

The exact confines of a group may vary from embodiment to embodiment. For example, in an embodiment, a group consists exclusively of patches having a measure of difference above a predefined threshold. The threshold may be selected and modified to various printing considerations. As another example, a group may include a number of patches that have relatively normal differences, as long as the group on the whole has an average measure of difference above a threshold level. In such an embodiment, techniques for determining whether a relatively normal patch is actually a part of a group may be designed to take into consideration a variety of objectives, such as maximizing or minimizing the size of a group, smoothing out the shape of the group, matching known group patterns, and so on.

Although the determination of whether a patch deviates significantly from an expected color value is discussed above in terms of a normal difference value, the determination may involve other considerations in addition or instead. For example, a group of patches may be deemed to deviate significantly from expected values if the group's measures of difference, as a whole, deviate significantly from patches surrounding the group. In this case, there is no threshold level of concern for the measures of differences, but rather there is a threshold level of concern with respect to the difference between the average measure of difference within the group as opposed to the average measure of difference outside of the group (or for the measured target as a whole). For instance, a group may be determined to deviate significantly from surrounding patches if its differences are, on average, a standard deviation above the average difference for the surrounding patches.

7.0. Diagnosing Issues and Identifying Corrective Measures

Spatial map data and color quality control data collected by a diagnostic server may be analyzed for a variety of purposes. For example, a technician may attempt to identify a problem of which the collected data is symptomatic. As another example, a manufacturer may analyze the data to identify possible manufacturing or logical defects in their printing devices.

For diagnostic purposes, the collected data may further be indexed in association with historical data relating to, for instance, maintenance, upgrades, and configuration changes. In an embodiment, if the print system is determined to have a specific problem at the time the copy of the diagnostic target was printed, or if a specific corrective measure is determined to fix spatial issues manifested in the printed copy of the diagnostic target, data describing the problem or solution may further be indexed in association with the color quality control data and/or spatial map data.

Some or all of the above data may be utilized to analyze newly submitted spatial map data or color quality control data from a print system. Based on pattern matching and/or machine learning algorithms, the diagnostic server may be capable of identifying in near real-time an exact problem that the print system may be having, or at least a list of potential problems. The diagnostic server may also or instead identify one or more corrective measures that may improve the performance of the print system. In an embodiment, the problems and/or corrective measures are reported to an operator of the print system.

In an embodiment, the diagnostic server may be configured to communicate with the print system and automatically apply various identified corrective measures. Upon applying the corrective measure(s), the diagnostic server may or may not then automatically command the print system to print a new copy of the diagnostic target to test whether the corrective measure(s) were effective.

In an embodiment, some of the corrective measures that may be taken include, without limitation: adjusting print setup, performing maintenance on various components, adjusting print algorithms, adjusting press blanket pressure, and so on. For example, a single column of highly deviant patches may be indicative of a mark on the imaging drum, thus suggesting a corrective measure of cleaning or replacing the imaging drum. As another example, a periodic horizontal pattern in the spatial map may suggest that wear in the bearings of the imaging drum has caused the drum to stutter, thus suggesting a corrective measure of replacing the bearings.

In an embodiment, certain patterns in the spatial map data may have directional components. For example, the difference values may grow higher or lower as the patches progress in one or more directions. Thus, one or more directional components in a spatial pattern may be analyzed to identify potential press performance issues. For example, if the difference values gradually fade across columns of patches, the pattern may indicate that the pressure on one side of the press blanket is greater or less than on the other side of the press blanket.

8.0. Generating and Selecting a Diagnostic Target Template 8.1. Site, Profile, or System Specific Customizations According to an embodiment, the effectiveness of a target may vary depending on a variety of printing conditions, such as the color profiles used, the print media being printed upon, the make and model of the print system, the specific spatial issues being tested for, and the preferences of a particular user. Thus, targets may be selected and/or fine-tuned to any of these conditions.

8.2. Number of Patches

According to an embodiment, the effectiveness of a target in diagnosing spatial issues may depend upon a variety of factors. For example, generally speaking, the greater the number of patches in the target, the more capable the target is of precisely defining exact groups where a spatial problem is manifest. However, various factors limit the number of patches that may be included in a patch, such as the size of the print media upon which the target is to be printed, the print resolution of the print system at which the target will be printed, and the sampling resolution of the measuring system that scans the target. Additionally, in an embodiment, patches should be of sufficient size to average out any "noise" in a patch that may be introduced on account of anomalous printing or scanning conditions at any particular point in the print media. Moreover, the greater the number of patches in a target, the more time it takes to scan and analyze the target. Accordingly, the number of patches in a target may be dependent upon budget and timing constraints as well. In an embodiment, the number of patches in a standard-size sheet may be, for instance, on the order of somewhere between two-hundred and one-thousand. However, other targets in other embodiments may have many more or many fewer patches.

8.3. Color Selection and Distribution

According to an embodiment, the effectiveness of a target may depend to some extent upon how randomly color values are distributed throughout a target. For example, an arrangement including a cluster of similar colors would be less effective in diagnosing spatial performance issues, in that one would be unable to determine the difference between a global color problem that affects the similar colors and a spatial problem that only affects the region of the page at which the group is located. However, a pseudo-random distribution achieved by a specialized algorithm may also produce an effective arrangement.

According to an embodiment, the effectiveness of target may depend upon the extent to which the target is designed so that, at any given time, an approximately equal amount of colorant is being applied in one or both or a vertical or horizontal direction. In an embodiment, the direction includes at least the direction in which a print system is capable of printing, as many printers print entire lines of a page at the same time. For the purposes of simplification, the word "column" as used herein may refer to either a vertical or horizontal direction, regardless of the orientation of the print media. Thus, in an embodiment, targets are optimized so that the total amount of colorant used for at least one colorant, up to potentially all colorants, is approximately the same for each column of color patches.

Figure 6:
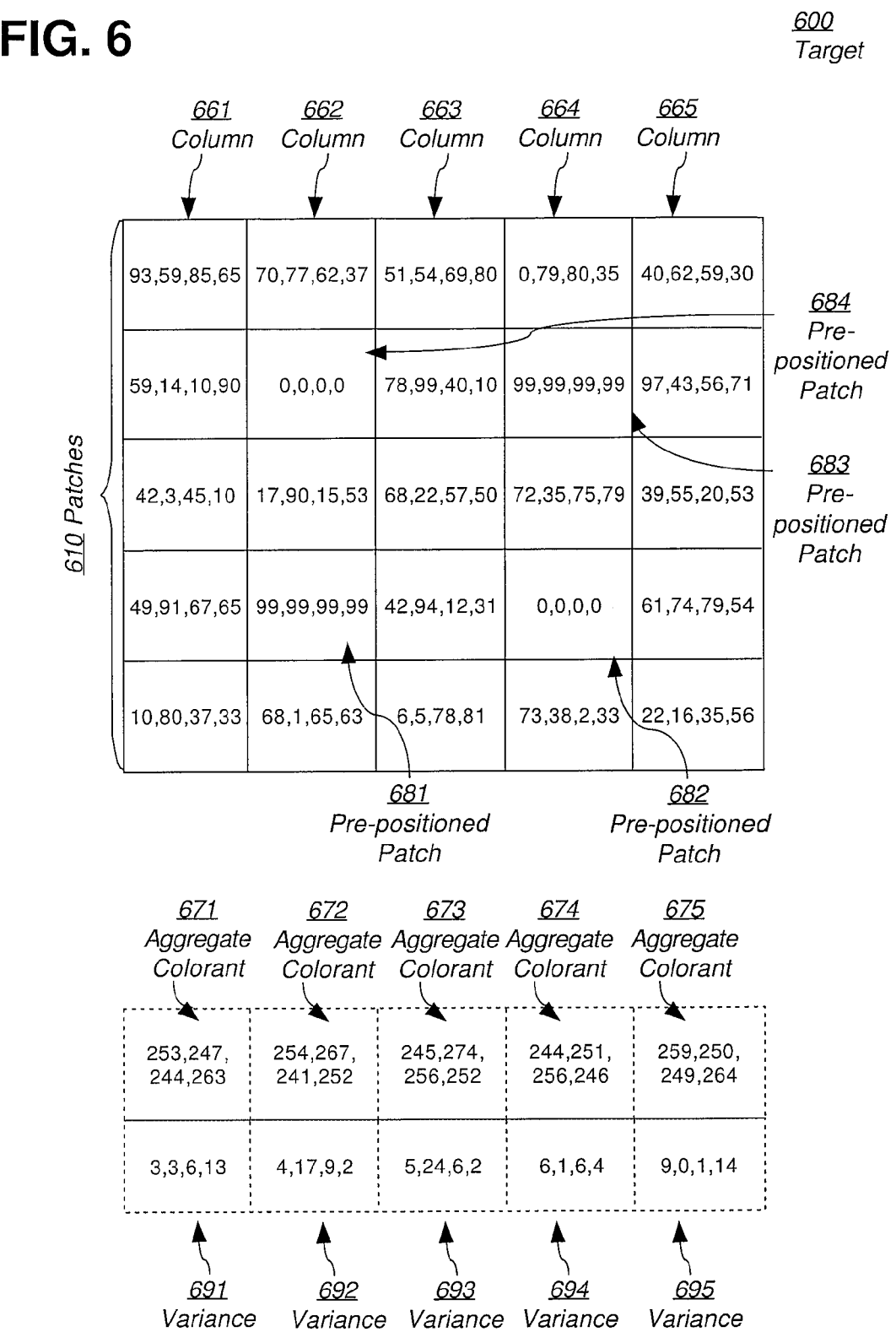
FIG. 6 depicts another example diagnostic target.

As an example of a target designed to have columns of approximately equal amounts of ink, FIG. 6 depicts another example diagnostic target 600 according to an embodiment of the invention. For illustrative purposes, target 600 has only five columns 661-665 with five patches 610 each, however the techniques discussed herein with respect to target 600 may easily be extended to targets of any size.

The color of each patch 610 is represented by a four parameter value, with the first parameter representing an amount of a first colorant, the second parameter representing an amount of a second colorant, the third parameter representing an amount of a third colorant, and the fourth parameter representing an amount of a fourth colorant. The colorants may be, for example, cyan, magenta, yellow, and black corresponding to a CMYK color space. However, other color spaces may be used, including color spaces with different numbers of primary colors. In an embodiment, a color-metrically scaled color space that is directly related to human perception, such as CIELab (CIE 1976 L*, a*, b*), may be used, but the described techniques may be practiced with respect to any color space. In an embodiment, the target itself need not define colors in such a color space; however, for purposes of the calculations described below, the colors may temporarily be converted into such a color space.

Aggregate colorant values 671-675 represent the aggregate colorant in each patch in columns 661-665 respectively. For example, as indicated by aggregate color value 671, the aggregate color value for column 661 is (253,247,244,263). It should be noted that each of the aggregate colorant values 671-675 is relatively close but not necessarily equal to a mean value of (250,250,250,250). Thus, as the print system prints the patches 610, the print system will at any given time be outputting roughly equal amounts of colorant for each colorant in its color space. Variance scores 691-695 reflect the differences between the aggregate color values and their respective target mean values.

In the depicted embodiment, the target has been designed around mean values of (250,250,250,250), meaning that approximately equal amounts of colorant are intended to be used for all colorants output by the printer. However, in other embodiments, colorant usage may only be approximately equal across all columns for less than all of the colorants, or even for just a single colorant. For simplification, colorants for which the target is designed to output approximately equal amounts across all columns may hereinafter be distinguished as "homogeneous colorants."

In an embodiment, a pseudo-random technique for generating a target such as target 600 may involve initially selecting positions for color patches based on random values, but increasingly placing constraints on the random selection over time, so as to ensure that the amount of colorant used for at least one colorant approaches a target mean value for each column. As another example, a non-constrained randomization technique is described in section 8.5.

As explained above, the total amount of a homogenous colorant used for each column need not exactly match a target mean value, but should be substantially close to a target mean value. In an embodiment, the total amount of colorant should be within a predefined threshold, such as a standard deviation, of the target mean value. The predefined threshold may depend on a variety of factors such as the complexity of the print system, or the demands of a print job. In an embodiment, there is not necessarily a predefined threshold, but rather multiple candidate targets are generated. The candidate targets are scored statistically based at least upon how close the total colorant used for each homogenous colorant comes to approaching a total mean value for that that colorant.

A variety of scoring mechanisms may be used. For example, the scoring may involve a simple average of the differences between each colorant's target mean value and the average amount of the colorant in each column. However, scoring may be more complicated. For example, in an embodiment, the scoring may be such that a target whose colorants are all relatively close to their respective mean values is selected over a target with a lower average deviation for the colorants, but that nonetheless has at least one colorant or even one column with a significantly high deviation. In an embodiment, the scoring is but one of several factors considered when scoring candidate targets. For example, a target may be selected as long as it is scored above or below a threshold score, even if it did not receive the best score.

8.4. Predefined Patches

In an embodiment, a subset of the patches in a target may be of predefined colors. The patches with predefined colors may be strategically located for a variety of diagnostic purposes. For example, certain "blank" patches—usually indicated by a white color—may be placed around the target to test both the color of the print media, as well as spatial discrepancies in the color of the print media. Target 600, for example, includes two such pre-positioned patches 682 and 684. As another example, various patches may be designated as maximum ink patches, in which the print system places as much ink as possible for various diagnostic purposes. Target 600 includes two such pre-positioned patches 681 and 683. The top row of patches 310 of FIG. 3 is yet another example of pre-positioned patches. The patches may correspond to, for instance, a rotation of cyan, magenta, and yellow.

In an embodiment, the positions of the remaining patches are selected randomly or pseudo-randomly. The prepositioned colors are nonetheless included in the total ink calculation explained above.

8.5. Example Method

Figure 7:
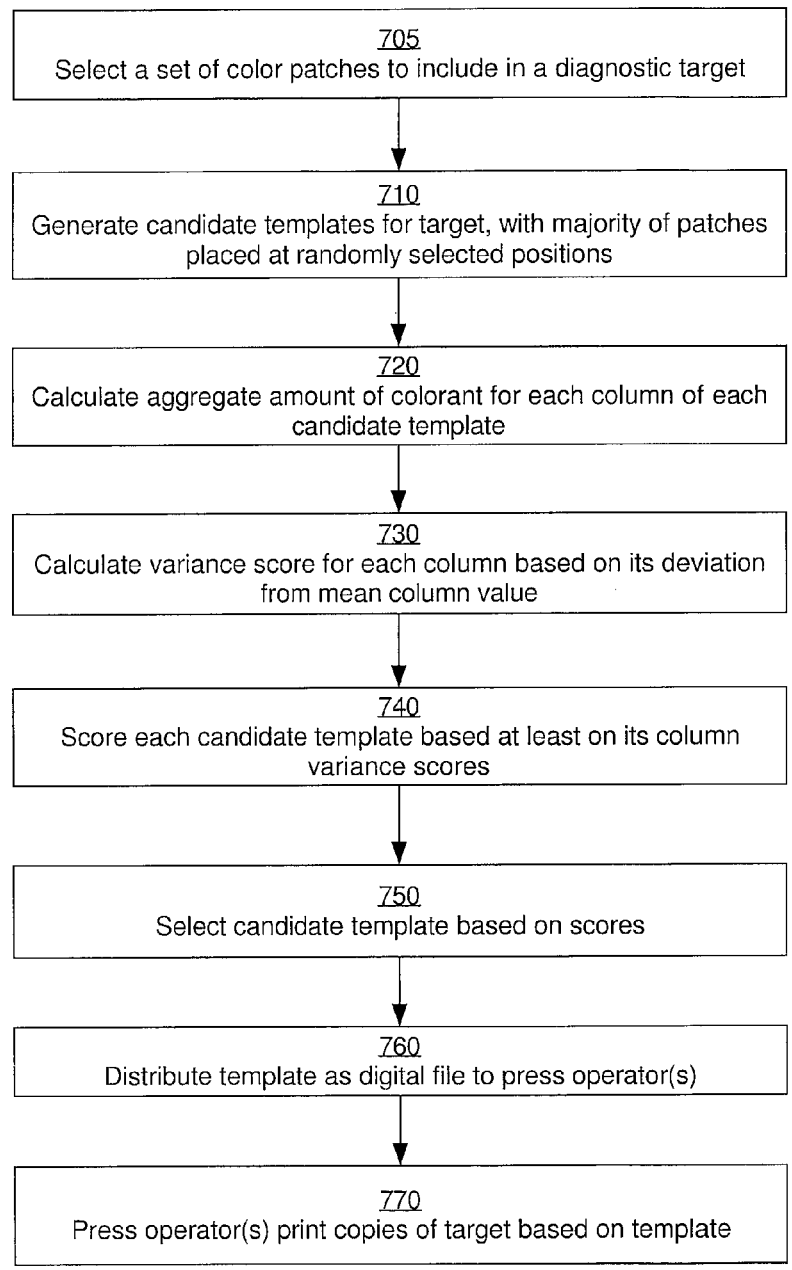
FIG. 7 is a flow chart illustrating an example method for generating a diagnostic target.

FIG. 7 is a flow chart 700 illustrating an example method for generating a diagnostic target, according to an embodiment. FIG. 7 illustrates but one of many techniques that may be used to generate a diagnostic target. Other techniques may omit certain steps or include additional steps. Moreover, other techniques may include steps executed in alternative orders.

At block 705, a target provider, such as a manufacturer or an operator of a diagnostic server, selects a set of color patches to include in a diagnostic target. The colors of the color patches in the set are selected for purposes other than diagnosing spatial issues. For example, the set of color patches may be optimized for computing quality control color metrics for a particular type of printer or particular type of print usage pattern—for example, a set of color patches having skin-tone colors.

At block 710, the target provider generates candidate templates for the diagnostic target by randomly positioning most or all of the patches in the candidate templates. A random number generator or any other suitable randomization mechanism may be employed to identify a random position. In an embodiment, the randomization process is unconstrained, meaning that all possible patches not previously selected for a position within a template are equally likely to be selected for the next unassigned position within the template. However, in an embodiment, pseudo-random mechanisms may instead be employed.

If prepositioned patches are to be used, then a predefined subset of the patches are assigned to the same predefined locations on each of the candidate templates. For example, a base template in which the positions of only some of the color patches are defined may be applied to each candidate template to pre-populate patches at the predefined locations. Positions for those patches not defined by the base template are then selected randomly. If predefined patches are not to be used, positions for all color patches are selected randomly.

As a result of the randomization process, each candidate template is likely to have a unique and different arrangement of colored patches. Any number of candidate templates may be generated. For example, in an embodiment, somewhere on the scale of a million candidate templates may be generated.

At block 720, for each column of each candidate template, an aggregate colorant amount, such as aggregate colorant amounts 671-675, is calculated for each homogenous colorant that must be printed to produce the color patches in the column. The aggregate colorant amount may be any function of the amount of the colorant necessary for each patch in the column, such as a sum or average.

At block 730, for each column of each candidate template, each of the column's calculated aggregate colorant amounts is compared to a respective mean column value to calculate a variance score, such as variance scores 691-695. The mean column value for a given colorant amount may be, for example, the average aggregate amount of that colorant across all columns in the template. Or, the mean column value may be predefined to a desired amount for the colorant. The variance score may be computed as a simple difference, or may be calculated using a more complicated function.

At block 740, a score is calculated for each candidate template. The score for each candidate template is a function of the variance scores calculated in step 730, such as a sum, standard deviation, or average. In an embodiment, this step comprises computing an average or standard deviation of the variance scores for each colorant. The final score for the template may then be an average of the scores for each colorant.

At block 750, the target provider selects, as the template for the diagnostic target, the candidate template having the best score. In an embodiment, however, having the best score is only one factor in selecting the final template. For example, a subset of the candidate templates having the lowest scores may be selected. From that group the candidate template whose colorant scores have the lowest standard deviation may be selected.

At block 760, the target provider distributes the template as a digital file to one or more press operators.

At block 770, the press operators print a copy of the target based on the template provided in block 760.

9.0. Implementation Mechanism—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
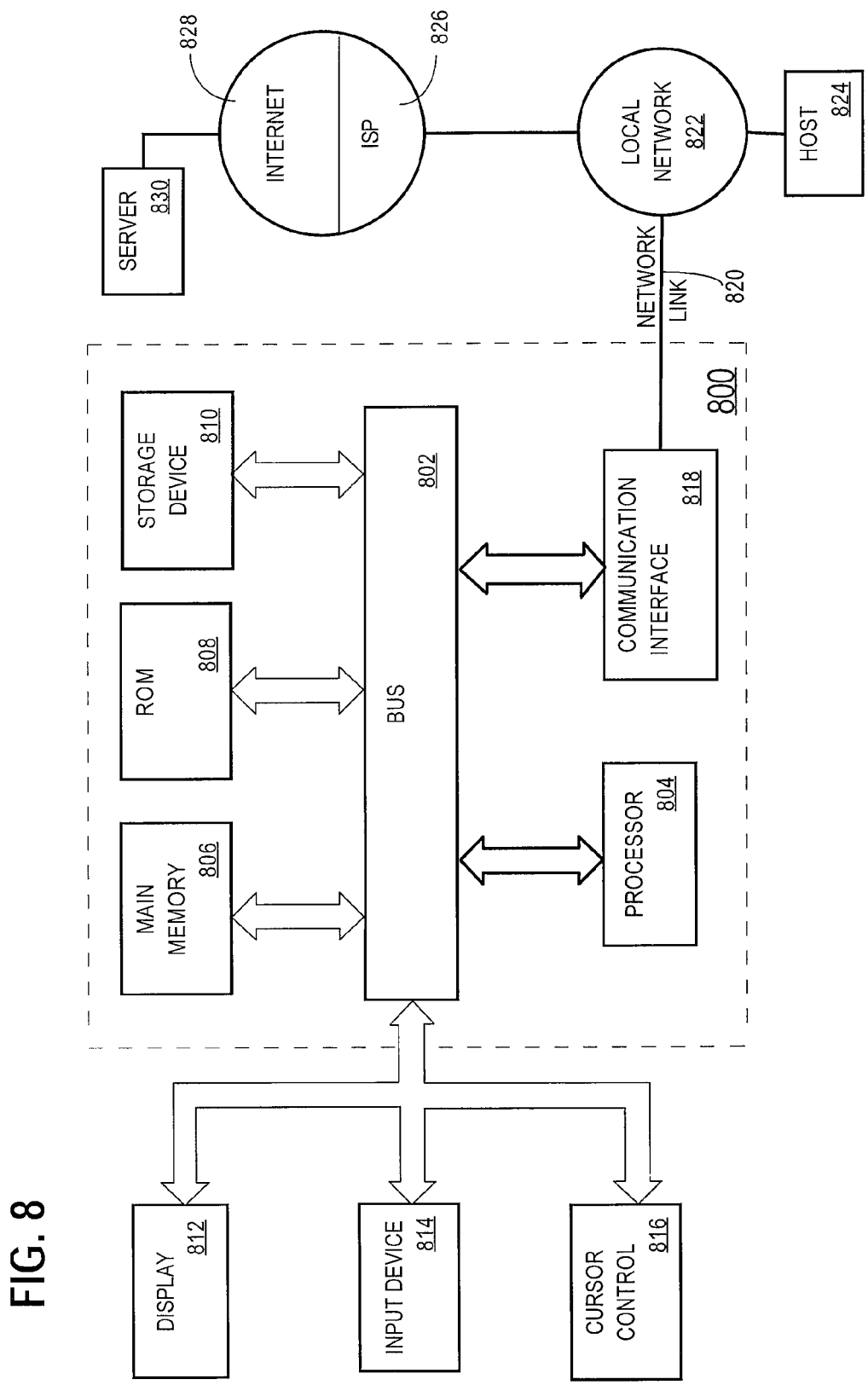
FIG. 8 is block diagram of a computer system upon which embodiments of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that include bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

10.0. Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   accessing reference data describing a diagnostic target for evaluating print system performance, wherein the diagnostic target comprises a plurality of color patches;
   wherein the reference data specifies expected color values for each of the plurality of color patches in the diagnostic target;
   accessing measured color values for each of the plurality of color patches in a printed copy of the diagnostic target, the printed copy having been printed by a particular print system;
   determining a set of difference values by performing a comparison between a measured color value of each patch in the plurality of color patches and the expected color value of the patch;
   identifying a group of two or more patches in the plurality of patches based on a comparison of the difference values to normal difference values for at least an area of the diagnostic target;
   wherein the group of two or more patches form a spatial pattern that identifies a spatial defect of the particular print system;
   wherein the method is performed by one or more computing devices.

2. The method of claim 1,
   wherein the plurality of color patches comprises a plurality of columns of color patches, the columns being oriented in either a vertical or horizontal direction;
   wherein the diagnostic target is such that the total amount of at least one colorant that the particular print system is expected to have used to print each column of color patches of the plurality of columns of color patches is approximately equal.

3. The method of claim 1 wherein the plurality of color patches is arranged within the diagnostic target according to a random distribution.

4. The method of claim 1,
   wherein the diagnostic target was generated through a process that, for each patch in a predefined set of patches of the plurality of patches, assigned a predefined position within the diagnostic target to the patch;
   wherein the process assigned random positions or pseudo-random positions to those patches of the plurality of patches that are not in the predefined set of patches.

5. The method of claim 1, further comprising, based on the identified group of two or more patches, determining that the particular print system has a press defect.

6. The method of claim 1, further comprising accessing a scanned representation of the printed copy of the diagnostic target, wherein the scanned representation indicates the measured color values.

7. The method of claim 1, further comprising:
   maintaining historical data describing: a) a plurality of scanned representations of previously printed copies of the diagnostic target; and b) corrective measures associated with at least some of the scanned representations of the previously printed copies of the diagnostic target; and
   based on comparing a scanned representation of the printed copy of the diagnostic target to the historical data, identifying one or more potential corrective measures for the particular print system.

8. The method of claim 1, wherein identifying the group of two or more patches is performed as part of a pattern recognition process against a database of patterns, wherein each pattern in the database of patterns is associated with one or more potential printing defects.

9. The method of claim 1, wherein the spatial pattern comprises a directional trend that comprises a progression of the difference values in one or more directions.

10. A non-transitory computer storage medium encoded with a computer program, the program comprising instructions that when executed by a data processing apparatus cause the data processing apparatus to:
    access reference data describing a diagnostic target for evaluating print system performance, wherein the diagnostic target comprises a plurality of color patches, wherein the reference data specifies expected color values for each of the plurality of color patches in the diagnostic target;
    access measured color values for each of the plurality of color patches in a printed copy of the diagnostic target, the printed copy having been printed by a particular print system;
    determine a set of difference values by performing a comparison between a measured color value of each patch in the plurality of color patches and the expected color value of the patch;
    identify a group of two or more patches in the plurality of patches based on a comparison of the difference values to normal difference values for at least an area of the diagnostic target, wherein the group of two or more patches form a spatial pattern that identifies a spatial defect of the particular print system.

11. The non-transitory computer storage medium of claim 10,
    wherein the plurality of color patches comprises a plurality of columns of color patches, the columns being oriented in either a vertical or horizontal direction; and wherein the diagnostic target is such that the total amount of at least one colorant that the particular print system is expected to have used to print each column of color patches of the plurality of columns of color patches is approximately equal.

12. The non-transitory computer storage medium of claim 10, wherein the plurality of color patches is arranged within the diagnostic target according to a random distribution.

13. The non-transitory computer storage medium of claim 10,
wherein the diagnostic target was generated through a process that, for each patch in a predefined set of patches of the plurality of patches, assigned a predefined position within the diagnostic target to the patch; and
wherein the process assigned random positions or pseudo-random positions to those patches of the plurality of patches that are not in the predefined set of patches.

14. The non-transitory computer storage medium of claim 10, wherein the instructions to cause the data processing apparatus to identify a group of two or more patches in the plurality of patches comprise instructions to cause the data processing apparatus to determine, based on the identified group of two or more patches, that the particular print system has a press defect.

15. The non-transitory computer storage medium of claim 10, wherein the instructions to cause the data processing apparatus to access reference data describing a diagnostic target comprise instructions to cause the data processing apparatus to access a scanned representation of the printed copy of the diagnostic target, wherein the scanned representation indicates the measured color values.

16. The non-transitory computer storage medium of claim 10, further comprising instructions to cause the data processing apparatus to:
maintain a historical data describing: a) a plurality of scanned representations of previously printed copies of the diagnostic target; and b) corrective measures associated with at least some of the scanned representations of the previously printed copies of the diagnostic target; and
identify, based on comparing a scanned representation of the printed copy of the diagnostic target to the historical data, one or more potential corrective measures for the particular print system.

17. The non-transitory computer storage medium of claim 9, wherein the instructions to cause the data processing apparatus to identify a group of two or more patches in the plurality of patches comprise instructions to cause the data processing apparatus to identify the group of two or more patches as part of a pattern recognition process against a database of patterns, wherein each pattern in the database of patterns is associated with one or more potential printing defects.

18. The non-transitory computer storage medium of claim 10, wherein the spatial pattern comprises a directional trend that comprises a progression of the difference values in one or more directions.

\* \* \* \* \*